United States Patent [19]

Mann

[11] 4,089,924

[45] May 16, 1978

[54] PROCESS FOR MAKING CAST ARTICLES HAVING A FRACTURED SURFACE

[76] Inventor: Max E. Mann, 19201 Hamilton St., Gardena, Calif. 90247

[21] Appl. No.: 700,540

[22] Filed: Jun. 28, 1976

Related U.S. Application Data

[63] Continuation of Ser. No. 531,607, Dec. 11, 1974, abandoned, which is a continuation-in-part of Ser. No. 327,470, Jan. 29, 1973, abandoned.

[51] Int. Cl.[2] .......... B32B 3/02

[52] U.S. Cl. .......... 264/157; 264/240; 264/333

[58] Field of Search .......... 264/42, 333, 108, 133, 264/DIG. 43, 157, 138, 240

[56] References Cited

U.S. PATENT DOCUMENTS

| | | | |
|---|---|---|---|
| 1,568,070 | 1/1926 | Jennens | 264/42 |
| 3,247,294 | 4/1966 | Sabouni | 264/42 |

FOREIGN PATENT DOCUMENTS

| | | | |
|---|---|---|---|
| 1,927,947 | 12/1970 | Germany | 264/42 |
| 1,178,941 | 1/1970 | United Kingdom | 264/42 |

OTHER PUBLICATIONS

Grobau, *A Textbook of Geology*, (1922)–p. 81.

*Primary Examiner*—Robert F. White
*Assistant Examiner*—John A. Parrish
*Attorney, Agent, or Firm*—Lyon & Lyon

[57] ABSTRACT

Disclosed herein is a process for making structural members of concrete or the like having a fractured or fracture-like surface wherein expansive agents are employed to break intra-concrete bonds along the desired fractured surface to create a fracture stratum in the member.

16 Claims, 11 Drawing Figures

PROCESS FOR MAKING CAST ARTICLES HAVING A FRACTURED SURFACE

This is a continuation of application Ser. No. 531,607, filed Dec. 11, 1974, now abandoned, which is a continuation-in-part of my co-pending application, Ser. No. 327,470, filed Jan. 29, 1973, entitled PROCESS FOR MAKING CAST ARTICLES HAVING A FRACTURED SURFACE, now abandoned.

BACKGROUND OF THE INVENTION

The present invention relates generally to cast structural members, and particularly to concrete members having at least one roughened surface giving the appearance of a fracture. Depending upon the intended use of the members, such a fractured appearance may provide either an aesthetic appearance, provide structural advantages or both. Reference shall be made herein to the casting of concrete members although it is contemplated that the process is applicable to other casting materials as well.

In the past, members have been made of concrete with a roughened or fractured surface by actually mechanically fracturing the concrete after it has set. This has frequently been done by driving wedges or the like into the cast concrete and actually splitting it. The difficulty is that cast concrete is amorphous in structure and provides no actual fracture lines or cleavage planes with the result that it is difficult to create a member with a fractured surface if the member is particularly large in surface area and, in addition, it is difficult to predict the thickness of the finished structure inasmuch as it cannot be definitely determined where the fracture will occur.

SUMMARY OF THE INVENTION

A principal object of the present invention is a simple and inexpensive process for making cast structural members, such as construction blocks, panels, walks, roadways, decorative pieces and the like, wherein a rough fractured surface of random configuration is provided upon as many surfaces thereof as desired. Such a roughened surface may be used for purely ornamental purposes such as for facia panels, walls and other building surfaces. Alternatively, the roughened surface may be structural or functional in purpose such as to create a planned zone of weakness in a concrete member, to establish a rough surface to improve friction or traction, or a bonding surface of enhanced adhesion capability.

I have found such a fractured surface may be formed on cast structural members formed from concrete or the like by creating a fracture stratum in the cementitious mixture wherein the intra-cement bonds have been irregularly broken by expansive agents. The expansive agents suitable for use in the method of the invention are described below.

In one preferred embodiment, the fracture stratum may be established in the cementitious mixture by embedding the expansive agents in the cementitious mixture in a stratum corresponding to the position of the finished fractured surface prior to the time the mixture has set. Preferably, the expansive agents are chosen so that the absorption of water by them will cause them to expand at a time after the cementitious mixture has initially set and intra-concrete bonds have been established throughout the mixture including that portion of the mixture which contacts the expansive agents.

In a second preferred embodiment of the invention, the fracture stratum may be formed by the process of the invention by embedding frangible tubes or the like in an unset cementitious mixture in a stratum corresponding to the desired position of the finished fractured surface and then allowing the mixture to set. Thereafter, the expansive agents may be placed in the frangible tubes and caused to expand so that their expansive forces are brought to bear on the intra-concrete bonds of the concrete thereby fracturing the intra-concrete bonds and establishing a fracture stratum in the set concrete member.

In all embodiments of the invention, the size and spacing of the expansive agents or the frangible tubes must be such that when the expansive agents expand, the intra-concrete bonds of the cementitious mixture are sufficiently broken to establish a fracture stratum along the desired fractured surface of the finished member. Where the expansive agents are added directly to the cementitious mixture before it has set, it is preferable that the agents expand by the absorption of water either from the cementitious mixture or from additional water added to the cementitious mixture or to the agent. However, in this embodiment, the expansive agent must expand sufficiently slowly so that the intra-concrete bonds of the cementitious mixture have formed before the expansive agent has significantly expanded. Of course, in the embodiment of the invention wherein the expansive agents are added to frangible tubes placed in the cementitious mixture which has subsequently set, the speed with which the expansive agents expand is not critical.

DETAILED DESCRIPTION OF THE INVENTION

Figure 1:
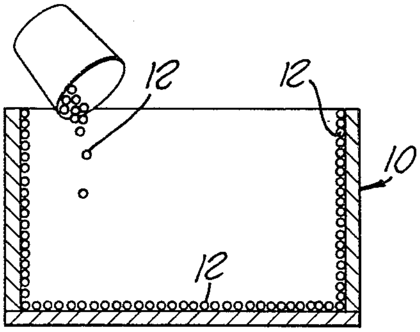
FIGS. 1, 2 and 3 demonstrate the principal steps taken in the production of a cast object having fractured surfaces on three sides thereof.

In the preferred embodiment of the invention described below, a fracture stratum is established in the finished cementitious mixture by one of two preferred methods. As used herein, the "fracture stratum" defines a stratum in the cementitious mixture wherein a sufficient number of the intra-concrete bonds have been fractured so that a fractured surface is readily established in the cementitious material. For example, when the expansive agents are placed in a stratum bisecting a cementitious mixture, as described below, it is preferable that the expansive agents fracture essentially all of the intra-concrete bonds along the plane so that the two halves of the finished product may be easily separated. However, it is only necessary that a sufficient number of the bonds be broken to establish a fracture stratum whereby the application of relatively light mechanical force will result in the two halves of the structure being easily separated, as for example, by light chiseling.

As used herein, the term "intra-concrete bonds" means the chemical and physical bonds which form within a cementitious mixture as a result of the hdyration of the cement in the cementitious mixture. These bonds include both the chemical bonds which establish the cement structure and the physical/chemical bonds between the cement in the cementitious mixture and aggregate or other components normally found in cement mixtures.

In a first preferred method, the expansive agents are embedded in the cementitious mixture along a stratum corresponding to the desired finished fractured surface prior to the initial setting of the cementitious mixture, that is, prior to the formation of the intra-concrete bonds. The mixture is then allowed to set. The expansion of the expansive agents in the set mixture breaks the intra-concrete bonds and establishes the fracture stratum. The expansive agents can then be readily removed from the stratum leaving a fractured surface.

In this method of establishing a fracture stratum, the expansive agents preferably expand on the absorption of water either as a result of the absorption itself or as a result of a chemical reaction initiated by the absorption. The expansion characteristics of the expansive agents are preferably such that the major portion of their expansion and the expansive force associated therewith, occurs sufficiently long after the expansive agents have been placed in the cementitious mixture so that the intra-concrete bonds in the stratum of the cementitious mixture corresponding to the desired fractured surface have formed. In typical concrete formation this period of time is at least about 3 hours after the concrete has been poured and the expansive agents embedded therein.

Therefore, it is preferable that the expansive agents expand at a rate so that the major portion of their expansive force is exerted after a period of time of from 3 to 10 hours after the expansive agents have been embedded in the cementitious mixture. It will readily be appreciated that this period of time may vary somewhat depending on the particular characteristics of the cementitious mixture. However, the setting characteristics of various cementitious mixtures are well known to the art and no undue experimentation would be required to determine which of the expansive agents of the invention were suitable with particular cement formulations. For example, a quick-setting concrete would allow the use of a correspondingly more quickly expanding expansive agent.

The expansive agents are also preferably particulate in nature, as for example, the various seeds described below. In order to create the fracture stratum of the invention, I have determined that the particle size of the expansive agent must be adequate to create a corresponding volume change sufficient to fracture the intra-concrete bonds. Similarily, the concentration of the expansive agents along the fracture stratum should be sufficiently great to fracture a sufficient number of intra-concrete bonds to establish the fracture stratum. I have found that a fracture stratum may be established by covering about 50% or more of the "surface" area of the layer of concrete at the point of the desired fractured surface with the expansive agents.

Preferably, the water required to initiate expansion of the expansive agent is obtained directly from the cementitious mixture by providing a sufficiently wet mixture, as for example, a mixture with a 5 inch slump. However, it is within the scope of the invention to externally add water to the expansive agent as by wetting the cementitious mixture after it has taken its initial set or by pre-soaking the expansive agents to initiate expansion which will continue at a sufficiently slow rate so that the agents may be added to the cementitious mixture and intra-concrete bonds be formed therein before the major portion of the expansion of the expansive agents occurs.

A second method of establishing a fracture stratum of the invention described below is to place frangible tubes in the cementitious mixture before it sets. After the mixture has set, expansive agents may be added to the tubes, the end of the tubes sealed and expansive agents then caused to expand to fracture the intra-concrete bonds along the fracture stratum. In employing this method, it is not necessary that the expansive agents have delayed expansion characteristics such as described above. All that is required is that the frangible tubes be placed at sufficiently close intervals and the expansive agents exert sufficient force to fracture a sufficient number of concrete bonds along the fracture stratum so that the cementitious mixture may be easily separated along that stratum.

I will now describe several, detailed, preferred embodiments of the invention employing the methods of establishing a fracture stratum described above.

DESCRIPTION OF A FIRST EMBODIMENT

Figure 2:
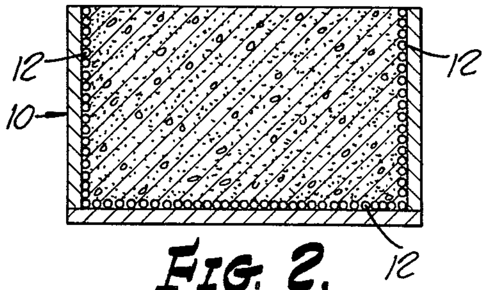
Figure 3:
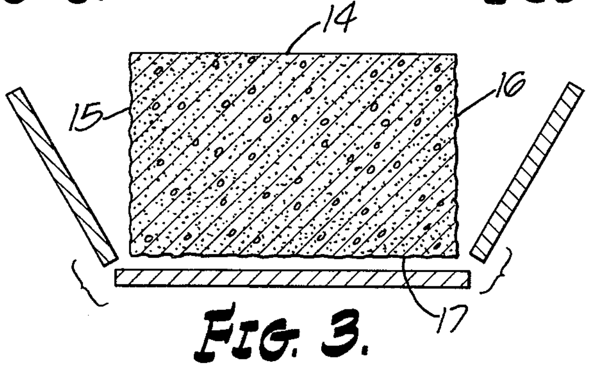

FIGS. 1 through 3 show in an elevation view a typical open box type mold 10 in which concrete or the like is to be cast. In FIG. 1, a quantity of expansion agents 12 are placed inside the mold 10 and made to adhere to the interior surfaces thereof by means of an adhesive coating initially placed on those surfaces. Next, the mold is filled with a cementitious mixture comprising rock, sand, cement and water, the quantities and qualities of which may be varied according to known techniques in the art depending upon the type of member being produced. In addition, chemical additives may also be included in the cementitious mixture in accordance with well-known principals in order to speed the setting quality of the concrete mixture. FIG. 2 shows the mold 10 filled with wet concrete filling the spaces between the expansion agents 12. Although the figures show the expansion agents in somewhat enlarged form, this is merely for illustrative purposes and the suitable sizes of the agents of the invention are as described herein.

After the mold is filled, the concrete in the mold begins curing and expansion of the agents under the influences of the water in the concrete begins. After the intra-concrete bonds have formed, the expansion agents continue to expand thereby breaking the intra-concrete bonds and establishing the fracture stratum.

In FIG. 3, the same mold is shown partially disassembled and the final molded structure 14 is shown having surfaces 15, 16 and 17 formed in a roughened or fractured configuration as the result of the expansion of the agents 12. Some rubble will be left from the expansion process (not shown in the illustration) and is merely removed and thrown away.

Depending upon the size and distribution of the expansion agents, deep or shallow fractures can be obtained. In addition, by adding additional expansion agents or mixing them more generally within the surface of the concrete in the area of the mold surfaces, a deeper fracture stratum is formed and thus deeper fractures can be obtained.

Although FIGS. 1 through 3 demonstrate the molding of an article with three fractured surfaces, it will be obvious that all of the surfaces could be formed in this manner, if desired, or only one of such surfaces. It will also be apparent to the art skilled that in this and other embodiments of the invention, any suitable means can be employed in place of the mold for supporting the setting concrete. My invention does not depend on using a conventional mold and, in fact, with some end uses and some concrete mixtures no support means would be required.

DESCRIPTION OF A SECOND EMBODIMENT

Figure 4:
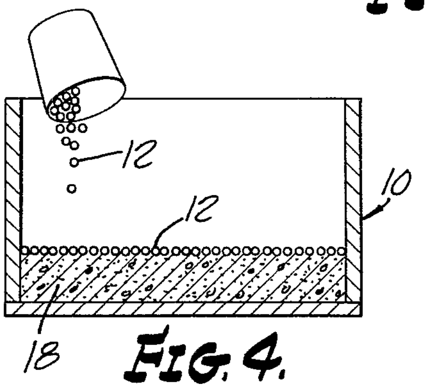
FIGS. 4, 5 and 6 demonstrate the principal steps taken in the production of a number of planar members having fractured surfaces.
Figure 5:
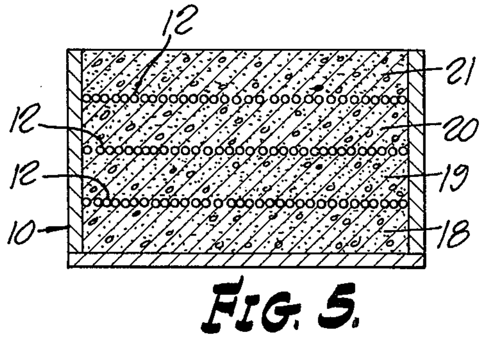
Figure 6:
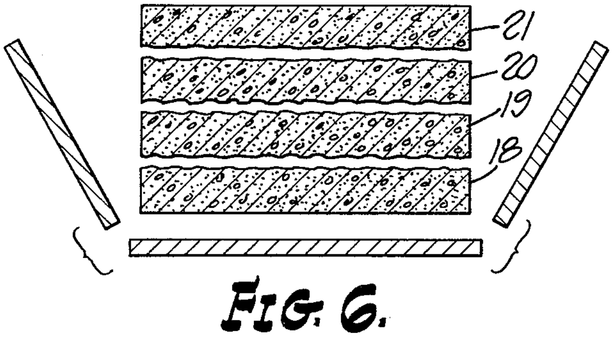

In FIGS. 4 through 6, a similar mold 10 is shown but here a fractured surface is not desired along the outside surfaces of the finished product so no expansion agents are made to adhere to the interior walls of the mold. In this process, a first layer of wet concrete is placed into the mold as shown at 18. Then, a quantity of expansion agents 12 is placed upon the upper surface of layer 18. Depending upon the viscosity of the wet concrete and the means by which the integrity of the stratum of the expansion agents is maintained, further layers of wet concrete and expansion agents are placed either immediately or at a later time into the same mold, as shown in FIG. 5.

Although FIG. 5 shows four separate layers of concrete with three intermediate layers of expansion agents, it is obvious that two layers may be employed with one intermediate layer of expansion agents, or the number might be increased beyond the number shown. Again, after the intra-concrete bonds are formed, the agents 12 expand to establish three fracture strata which results in four layers 18, 19 20 and 21 as shown in FIG. 6. Layers 19 and 20 are thus provided with both planar surfaces having fractured configurations while the upper and lower layers 21 and 18 have only one surface which has been fractured. By combining the features of the first embodiment with those of this embodiment, it is possible to provide a fracture surface on the bottom of layer 18. Similarly, by placing expansion agents upon the top of the upper layer 21 and then closing the mold with an additional mold piece, it would be possible to provide a fracture-like surface upon the upper planar area of layer 21.

DESCRIPTION OF A THIRD EMBODIMENT

Figure 7:
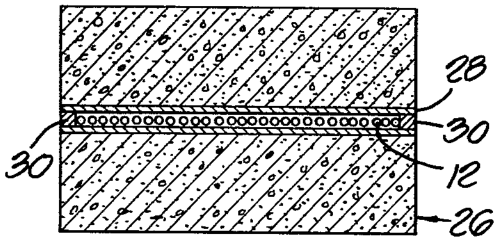
FIGS. 7, 8 and 9 demonstrate steps taken for the production of fractured surfaces in an already cast member.
Figure 8:
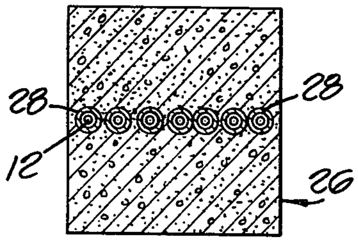
Figure 9:
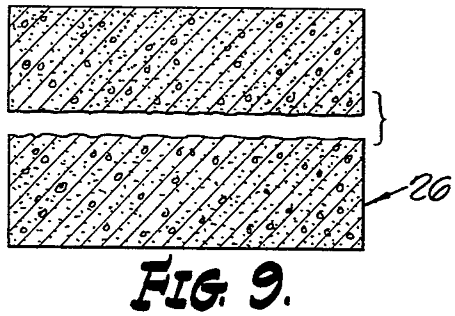

FIG. 7 shows in an elevation view an already cast block of concrete 26 in the interior of which has been embedded a number of frangible tubes 28. This may also be seen in the end view of FIG. 8. The tubes 28 are then filled with the expansive agent 12 and expansion of those agents in then initiated by introducing water inside the tubes 28 or as the result of their chemical reaction. The ends of tubes 28 are closed by means of plugs 30 to prevent longitudinal expansion inside the tubes. Expansion of the agents 12 will ultimately fracture the concrete block 26 in the plane of the tubes 28 to establish the fracture stratum of the invention and provide a finished block as shown in FIG. 9 having interposed fractured surfaces. The rubble from the expansion and the remnants of the tubes have been removed in FIG. 9.

DESCRIPTION OF A FOURTH EMBODIMENT

Figure 10:
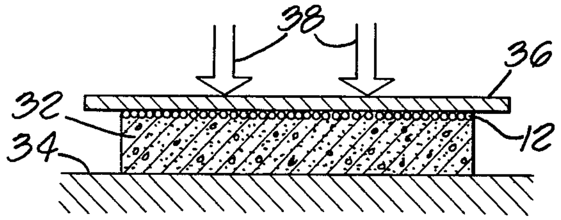
FIGS. 10 and 11 show the steps taken in the production of a planar member having an upper textured surface.
Figure 11:
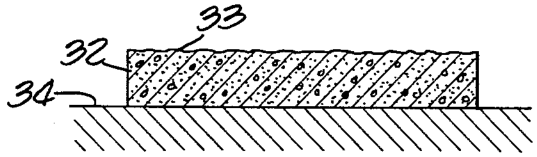

FIGS. 10 and 11 represent in an elevational view a concrete walkway or roadbed 32 layed upon a subsurface 34. While the concrete layer 32 is still in its plastic state, a layer of expansion agents 12 is distributed over the top surface thereof. A rigid plate 36 is then placed upon the top of the expansion agents and the wet concrete. The plate may be prevented from moving by either placing a heavy mass upon it or by anchoring it to the subsurface 34, as long as the plate is held firmly downward as demonstrated by the arrows 38. As before, the intra-concrete bonds form and the expansion agents expand to fracture the bonds in the fracture stratum. FIG. 11 shows the layer 32 with the plate removed and the upper surface 33 provided with a roughened configuration creating a surface that would improve friction or traction on it or which would provide a surface to which a second layer could be attached for better adhesion between the two.

My invention is further described by the following experimental examples wherein unless otherwise specified, the concrete mixture was a standard mix containing 20% cement, 32% sand and 48% by weight pea rock, and sufficient water was added to the concrete mix to give it a 5 inch or greater slump.

EXAMPLE I

The bottom of a 12 × 12 × 3 inch deep pan mold was successively covered with various seeds as indicated below. The coverage of the mold surface varied from 70% to 90%. The mold was then filled with standard concrete mix and allowed to set for at least 24 hours.

In one series of tests, beans were placed on the bottom of the mold with about 70% to 80% coverage. The concrete was observed to raise on the mold to about 1/16 to 3/16 of an inch after 24 hours and the bottom surface of the concrete had a fractured appearance. The following beans gave these results: broad long pod fava, bush lima fordhook, bush sure cropwax, bush romano, bush lima baby fordhook, bluelake pole, lima prizetaker pole, white seeded Kentucky wonder pole, long pod fava, dwarf horticultural shell, red kidney shell, white marrowfat shell, edible kanrich soybean, and scarlet runner.

The following peas were tested with results essentially the same as those noted for beans except the concrete movement was slightly less, being from about 1/16 to 3/32 of a inch: alaska peas, early ramshorn blackeye peas, early dwarf peas and mammoth sugar peas.

Other seeds which gave results equally as good as those demonstrated by the beans and peas were: shelled peanuts, sweetpea, nasturtium, purple vetch, hydrid silver queen corn and yellow hybrid sweet early corn.

Similar tests were conducted using alfalfa and barley seeds with the bottom of the mold being 90% or more covered. These test samples showed no movement of the concrete in the mold, and although the seeds were moist, little expansion was noted and the surface of the mold did not give fractured appearance. Other seeds which reacted similarly to alfalfa and barley were rye, detroit dark red beet, oats, small sugar pumpkin and mammoth sunflower.

EXAMPLE II

Using a 12 × 12 × 4 inch deep mold, four samples were prepared using (a) silver queen corn, (b) purple vetch, (c) bush lima baby fordhook beans, and (d) alaska pea in the following procedure. Approximately 2 inches of concrete was placed in the molds and vibrated. The seeds were then placed on the fresh concrete with approximately 40% coverage of the surface area. A second layer of concrete was then placed over the seeds to fill the mold. The filled mold was then vibrated by jolting.

In this series of tests, the concrete used was a quick-dry concrete having only a 1 to 2 inch slump. After 24 hours of curing time it was noted that no expansion or movement of the concrete was evident in the molds. Upon removal from the molds, the samples showed no fracture line. An attempt to fracture the samples by force with a hammer and chisel along the seed stratum was attempted to no avail. The conclusion reached was that no fracture stratum has been established in the samples.

EXAMPLE III

The procedure of Example II was repeated except that coverage of the seeds was increased to 70% and the concrete slump increased to five inches by the addition of additional water. After 24 hours of curing, all samples had raised in the molds from 1/32 of an inch to ⅛ of an inch and a visible crack was noted at the seed stratum in each sample. The top layer of concrete easily lifted off the bottom piece resulting, in each case, in two pieces of concrete approximately 2 inches thick, each having a fractured surface. These results indicate that a fracture stratum was clearly established in each of the samples since the concrete separated along the plane of the seeds.

EXAMPLE IV

The procedure of Example II was repeated using bush lima baby fordhook beans with approximately 70% seed coverage and with the concrete having 1 to 2 inch slump. After 24 hours of curing, no indication of expansion in the mold was noted. However, it was possible to chisel the sample apart at the seed stratum.

EXAMPLE V

The procedure of Example II was repeated using Lyphogel brand polyacrylamide gel manufactured by the Gelman Instrument Company, Ana Arbor, Mich. as an expansive agent. The Lyphogel had a particle size such that all the particles passed through an 8 mesh screen and they covered about 60% to 70% of the surface of the concrete which had a 4 to 5 inch slump. The Lyphogel has a 5:1 volume change on the absorption of water according to the manufacturers standards.

After 24 hours, it was observed that the concrete in the mold had raised and a fracture stratum had been established in the sample in the plane of the Lyphogel such that the two pieces of concrete separated easily. This resulted in two pieces approximately 2 inches thick, each having a fractured surface.

EXAMPLE VI

The procedure of Example II was repeated using bentonite expansive clay as an expansive agent. The bentonite was a fine powder and was spread over the entire surface of the first layer of concrete to a depth of about 1/64 to 1/32 of an inch.

After 24 hours the top layer of concrete had not raised in the mold but there was a complete fracture line in the sample at the plane of the bentonite. Upon observation it appeared that the fracture line was created by the fact that the bentonite acted as a barrier to the two layers of concrete. The bentonite was observed to be moist and expanded but it appeared that the expansion had occurred before the initial set of the concrete took place. The fracture plane was very uneven and was not a fractured surface.

EXAMPLE VII

A test sample was prepared by the procedure of Example II employing long pod fava beans as the expansive agent with 50% to 60% coverage of the beans and a concrete with a 4 to 5 inch slump. After 24 hours the top layer of concrete was raised approximately ⅛ of an inch. Upon removing the mold, the two pieces of concrete separated easily resulting in two pieces of concrete each approximately 2 inches thick and each having a fractured surface. In this test, the sample was observed 6 hours after casting and the only indication of expansion was a slight crack around the mold between the pan edges and the concrete. This observation confirms the fact that the expansion took place well after the initial set of the concrete occurred. Examination of the beans after separation of the sample showed them to be very soft, moist and expanded.

EXAMPLE VIII

Following the procedure of Example II, tapioca, rice and lettuce seeds were tested as expansive agents with coverages varying from 70% to 100%. In each case no satisfactory fracture surface cold be established in the samples. It was concluded that the small particle size of these proposed expansive agents coupled with the small actual increase in volume on expansion of those seeds that did expand, rendered them unacceptable as expansive agents of the invention.

EXAMPLE IX

Following the procedure of Example II, two test samples were prepared using bluelake pole beans at a coverage of about 70% to 80% in a dry concrete mixture having a 1 to 1½ inch slump. In the first sample, the beans were placed between the layer without any treatment. In the second sample, the beans were pre-soaked for 2 hours in warm water prior to being placed onthe concrete. Some of these beans were noticably expanded when placed on the concrete.

After 24 hours of curing, no sign of expansion was noted in the first sample and chiseling did not cause the sample to fracture in the bean plane indicating that no fracture stratum had been established. Some of the beans chiseled out of this sample proved to be hard and showed no signs of expansion.

The second sample in which pre-soaked beans had been used was raised approximately ⅛ of an inch after 24 hours and the two halves of the panel separated easily. The beans were observed to be expanded to a much greater degree than when placed in the mix.

EXAMPLE X

A small block of concrete was cast having plastic straws embedded therein in a plane. The straws were parallel to each other and had approximately ⅛ inch of concrete between each of them. Afer 24 hours of curing, the tubes were filled with purple vetch seed and water and plugged. No indication of fracture was observed after 6 hours or after 2 days. The sample was chiseled apart along the straw line with no particular indication of swelling of the seeds. It is believed that these results were caused by the fact that insufficient water reached the seeds and by the fact that the plastic straws were too strong and could have restrained the expansive force of the seeds.

EXAMPLE XI

A 12 × 12 × 4 inch thick sample was prepared having ¾ inch square styrofoam rods placed on 1 inch centers through the middle of the sample. After 48 hours of curing, the styrofoam was removed and bluelake pole beans placed in the cavities. Water was added and the holes sealed. The next morning the sample was inspected and two-thirds of the panel was fractured with the remainder being easily fractured with light chiseling in the plane of the holes.

These results indicate that a fracture stratum may be established in cured concrete by the use of expansive agents if frangible tubes of insufficient strength to constrain the expansive force of the seeds are employed. The tubes are also preferably of sufficient diameter to allow water to easily reach the seeds.

As is clear from the foregoing examples, a wide variety of seeds may be employed as the expansive agents of the invention. All have in common the desirable characteristics of the expansive agents of the invention; that is, they expand by absorption of water over a protracted period of time (from about 3 to about 10 hours) with a volume change sufficient to fracture the intra-concrete bonds along the fracture stratum when coverage of the seeds is about 50% or more and preferably about 70% or more. Seeds which do not exhibit such characteristics, for example, extremely small seeds such as lettuce or seeds which do not expand with a sufficient volume change such as rice, do not establish a fracture stratum in the cementitious mixture. It will be readily apparent to those skilled in the art that other seeds not named above but exhibiting the characteristics of the expansive agents of the invention may equally well be employed in the process of the invention.

Similarly, Example V demonstrates that particulate, chemical expansive agents may also be employed as the expansive agents within the scope of the invention. It will readily be appreciated that where the expansive agents have a large volume increase upon exposure to water, smaller particle sizes can be employed than if agents having a smaller increase in volume ratio are employed.

Lastly, the foregoing examples clearly demonstrate that the method of the invention is to establish a definite fracture stratum in the cementitious mixture and not merely create an artificial barrier in the mixture. For example, although bentonite clay does expand, its extremely small particle size results in the creation of an artificial barrier in the cementitious mixture when enough of the clay is added to effect the surface of the cement.

It will be readily apparent to the art skilled from the foregoing specification that any expansive agent which exhibits sufficient expansive force to fracture intra-concrete bonds may be employed in the process of the invention when the fracture stratum is created by a plurality of frangible tubes placed therein before the cementitious mixture has set.

I claim:

1. A process for making structural members from a cementitious material, at least one of the finished surfaces of said structural member having an irregular fractured configuration, comprising the steps of:

placing a quantity of particulate expansive agents in a quantity of unset cementitious material in a stratum corresponding to the desired position of the fractured surface, said expansive agents having the ability to expand with an expansive force and the ability to delay said expansion until after the initial set of said cementitious material and being in sufficiently large concentration to produce said fractured surface;

allowing the cementitious mixture to take an initial set whereby intra-concrete bonds are formed in the cementitious mixture; and allowing the expansive agents to expand to fracture a substantial portion of said intra-concrete bonds in said stratum to establish a fracture stratum in said structure member corresponding to the desired position of the fractured surface.

2. The process of claim 1, wherein the expansion of said expansive agents is caused by the absorption of water by said agents.

3. The process of claim 2, wherein said water is absorbed from within said cementitious mixture.

4. The process of claim 2, wherein said water is partially absorbed from a source external to said cementitious mixture.

5. The process of claim 4, wherein said expansive agents are pre-soaked in water prior to placing said agents in said stratum.

6. The process of claim 5, wherein the expansive agents are pre-soaked for a period of from about 1½ to about 3 hours.

7. The process of claim 1, wherein the stratum in which said expansive agents are place bisects the cementitious material whereby, when said fracture stratum is established in said cementitious material by the expansion of said expansive agents, two structural members are formed each having an irregular, fractured finished surface corresponding to the position of said fracture stratum.

8. The process of claim 1, wherein said expansive agents are placed on the upper surface of said unset cementitious material a compressive force is applied to said upper surface so that the expansive force of the expansive agents is applied to said intra-concrete bond.

9. The process of claim 1, wherein the expansive agents are placed in a stratum corresponding to the bottom surface of said cementitious material.

10. The process of claim 1, wherein said expansive agents are placed in a stratum corresponding to the sides of said cementitious material.

11. The process of claim 1, wherein said expansive agents are dispersed in said stratum in sufficient quantity, so that, they would cover about 50% of said surface.

12. The process of claim 1, wherein said expansive agents are selected from the group consisting of broad long pod fava beans, bush lima fordhook beans, bush sure cropwax beans, bush romono beans, bush lima baby fordhook beans, blue-lake pole beans, lima prizetaker pole beans, white seeded kentucky wonder pole beans, long pod fava beans, dwarf horticultural shell beans, red kidney shell beans, white marrowfat shell beans, edible kanrich soybeans, scarlet runner beans, alaska peas, early ramshorn blackeye peas, early dwarf peas, mammoth sugar peas, shelled peanuts, sweetpea seeds, nasturtium seeds, purple vetch seeds, hybrid silver queen corn, yellow hybrid sweet early corn and particulate polyacrylamide gel.

13. A process for making structural members of concrete or the like in which at least one finished surface has an irregular fractured configuration, comprising:

placing in a mold a quantity of particulate expansive agents to cover at least about 50% of the area of at least one of the inner surfaces thereof said expansive agents having the ability to delay expansion until after the initial set of the cementitious mixture;

placing in said mold a quantity of an unset cementitious mixture;

allowing the cementitious mixture to set whereby intra-concrete bonds are formed in the cementitious mixture;

allowing said expansive agents to expand to thereby fracture a substantial portion of said intra-concrete bonds in a stratum to establish a fracture stratum in said structural member; and removing the member from said mold and separating said agents from the surface thereof.

14. A process for making structural members of concrete or the like in which at least one finished surface has an irregular fractured configuration, comprising:

placing a quantity of an unset cementitious mixture upon a subsurface;

distributing a sufficiently large quantity of particulate expansive agents over the top surface thereof said expansive agents having the ability to delay expansion until after the initial set of the cementitious material said to produce fractioned configuration wherein;

placing a covering means over said combination and confining said agents in close communication with the top surface of said mixture by applying pressure to said covering means;

allowing the cementitious mixture to set whereby intra-concrete bonds are formed in the mixture;

allowing said expansive agents to expand to thereby fracture a substantial portion of said bonds along said top surface to establish a fracture stratum in said structural member; and removing said covering means and separating said agents from the finished member.

15. A process for making structural members of concrete or the like in which at least one finished surface has an irregular fractured configuration, comprising:

placing in a mold a first quantity of an unset cementitious mixture to form a first layer;

distributing a sufficiently large quantity of particulate expansive agents over the top surface of said first layer to produce a fractured stratum in said member wherein said expansive agents having the ability to delay expansion until after the initial set of the cementitious mixture;

placing in said mold a second quantity of said unset mixture to form a second layer on top of said first layer;

allowing both layers of cementitious mixture to set whereby intra-concrete bonds are formed in said cementitious mixture;

allowing said expansive agents to expand to thereby fracture a substantial portion of the intra-concrete bonds in said stratum corresponding to the position of the expansive agents; and removing said mold, separating said first and second layers into two structural members and removing the remainder of said agents from the surface of said layers.

16. The process of claim 15, wherein a plurality of structural members are provided by repeating the steps of placing a quantity of unset cementitious mixture in the mold and distributing expansive agents over the top surface thereof.

* * * * *